United States Patent
Bhandaru et al.

(10) Patent No.: US 9,436,254 B2
(45) Date of Patent: Sep. 6, 2016

(54) METHOD AND APPARATUS FOR PER CORE PERFORMANCE STATES

(75) Inventors: Malini K. Bhandaru, Sudbury, MA (US); Eric J. Dehaemer, Shrewsbury, MA (US); Samuel W. Ho, Framingham, MA (US); Scott P. Bobholz, Bolton, MA (US); Chris Poirier, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 13/976,682

(22) PCT Filed: Mar. 13, 2012

(86) PCT No.: PCT/US2012/028923
§ 371 (c)(1),
(2), (4) Date: Jun. 27, 2013

(87) PCT Pub. No.: WO2013/137865
PCT Pub. Date: Sep. 19, 2013

(65) Prior Publication Data
US 2014/0229750 A1  Aug. 14, 2014

(51) Int. Cl.
*G06F 1/26* (2006.01)
*G06F 1/32* (2006.01)
*G06F 9/50* (2006.01)

(52) U.S. Cl.
CPC ............ *G06F 1/3203* (2013.01); *G06F 1/329* (2013.01); *G06F 1/3243* (2013.01); *G06F 9/5094* (2013.01); *G06F 1/324* (2013.01); *G06F 1/3287* (2013.01); *G06F 1/3296* (2013.01); *Y02B 60/1239* (2013.01); *Y02B 60/142* (2013.01); *Y02B 60/144* (2013.01)

(58) Field of Classification Search
CPC .... G06F 1/3203; G06F 1/324; G06F 1/3296; G06F 1/3287
See application file for complete search history.

(56) References Cited

U.S. PATENT DOCUMENTS

2002/0095614 A1   7/2002  Rodgers et al.
2004/0039949 A1*  2/2004  Vollmer et al. ............... 713/300
(Continued)

FOREIGN PATENT DOCUMENTS

CN  1433544   7/2003
CN  1877492   12/2006

OTHER PUBLICATIONS

International Preliminary Report on Patentability for PCT Patent Application No. PCT/US2012/028923 mailed Sep. 25, 2014, 7 Pages.
(Continued)

*Primary Examiner* — Xuxing Chen
(74) *Attorney, Agent, or Firm* — Trop, Pruner & Hu, P.C.

(57) ABSTRACT

A method and apparatus for per core performance states in a processor. Per Core Performance States (PCPS) refer to the parallel operating of individual cores at different voltage and/or frequency points. In one embodiment of the invention, the processor has a plurality of processing cores and a power control module that is coupled with each of the plurality of processing cores. The power control module facilitates each processing core to operate at a different performance state from the other processing cores. By allowing its cores to have per core performance state configuration, the processor is able to reduce its power consumption and increase its performance.

24 Claims, 3 Drawing Sheets

(56) References Cited

U.S. PATENT DOCUMENTS

| | | |
|---|---|---|
| 2006/0123251 A1 | 6/2006 | Nakajima et al. |
| 2006/0282692 A1 | 12/2006 | Oh |
| 2009/0172423 A1 | 7/2009 | Song et al. |
| 2010/0299541 A1 | 11/2010 | Ishikawa et al. |
| 2011/0022857 A1 | 1/2011 | Nussbaum et al. |
| 2011/0219382 A1 | 9/2011 | Hou |
| 2012/0166832 A1* | 6/2012 | Henry et al. ............... 713/320 |
| 2012/0331310 A1* | 12/2012 | Burns ............... G06F 1/26 713/300 |
| 2014/0053009 A1* | 2/2014 | Semin ............... 713/322 |

OTHER PUBLICATIONS

International Search Report and Written Opinion for PCT Patent Application No. PCT/US2012/028923 Mailed Nov. 28, 2012, 10 Pages.

\* cited by examiner

| 410 Bit range | 420 Bit name | 430 Reset Value | 440 Bit descriptions |
|---|---|---|---|
| 31 | core_turbo_disable | 1'b0 | Turbo mode disable bit<br>Turbo is disabled for the core if disabled globally or by any thread associated with the core<br>The logical OR of thread_0_turbo_disable, thread_1_turbo_disable, and global_turbo_disable |
| 30 | vote_request | 1'b0 | The logical OR of vote_request from the threads associated with this core. Vote request is one for threads that are active |
| 19:16 | energy_efficiency_policy | ZERO | Energy efficiency policy<br>This field is the min. value (max. performance) across threads associated with the core that has voting rights<br><br>0 corresponds to maximum performance. The goal is to support the maximum performance requested across threads having voting rights associated with the core. Therefore, the minimum operator is used |
| 14:8 | min_p_state | ZERO | OS minimum P-state request<br>It is the max. of the min. P-state requested for the threads associated with this core which has voting rights |
| 6:0 | p_state_req | ZERO | P-state request. The max. of the P-state requested across threads associated with this core that has voting rights |

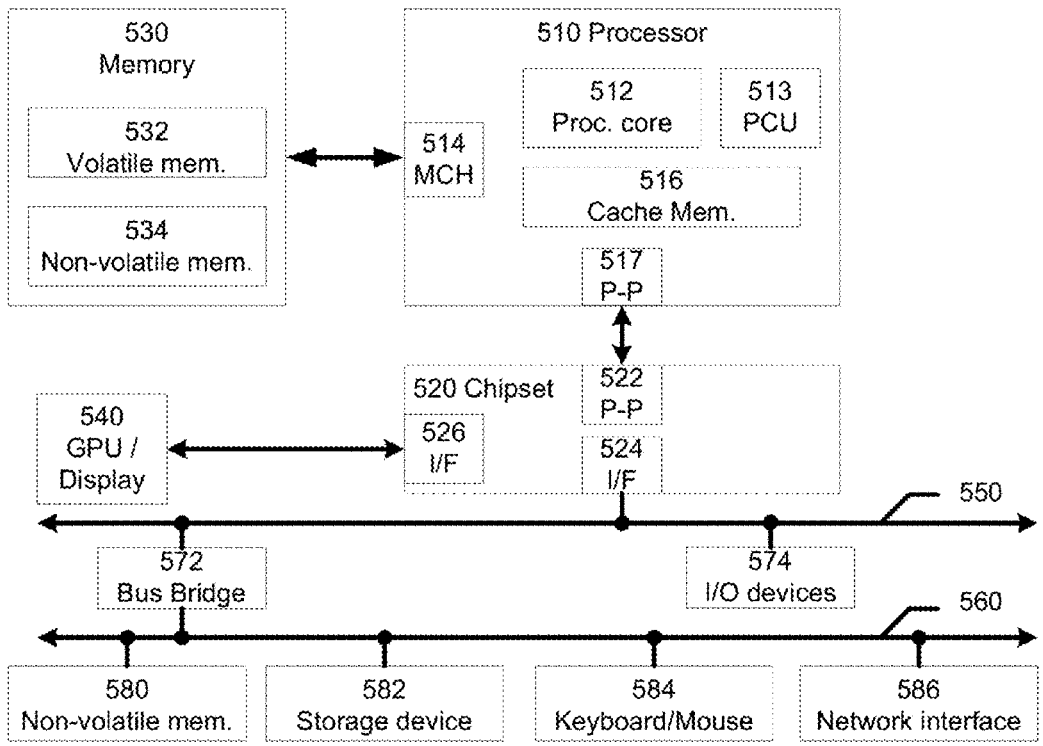

METHOD AND APPARATUS FOR PER CORE PERFORMANCE STATES

CLAIM OF PRIORITY

This application is a U.S. National Phase application under 35 U.S.C. §371 of International Application No. PCT/US2012/028923, filed Mar. 13, 2012, entitled "METHOD AND APPARATUS FOR PER CORE PERFORMANCE STATES," the entire contents of which are incorporated herein by reference.

FIELD OF THE INVENTION

This disclosure pertains to energy efficiency and energy conservation in integrated circuits, as well as code to execute thereon, and in particular but not exclusively, to a method and apparatus for per core performance states in a processor.

BACKGROUND DESCRIPTION

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated.

For example, in a multi-core assembly, all the cores may operate at a common voltage and frequency point which is the maximum frequency requested by its active threads. A common performance state for all the cores in the multi-core assembly results in burning more power than necessary when they are all not equally loaded or utilized, which in turn increases the cooling costs and lowers the battery life.

Furthermore, software inefficiencies, and its requirements of hardware, have also caused an increase in computing device energy consumption. In fact, some studies indicate that computing devices consume a sizable percentage of the entire electricity supply for a country, such as the United States of America. As a result, there is a vital need for energy efficiency and conservation associated with integrated circuits. These needs will increase as servers, desktop computers, notebooks, netbooks, ultrabooks, tablets, mobile phones, processors, embedded systems, etc. become even more prevalent (from inclusion in the typical computer, automobiles, and televisions to biotechnology).

BRIEF DESCRIPTION OF THE DRAWINGS

The features and advantages of embodiments of the invention will become apparent from the following detailed description of the subject matter in which:

FIG. 4 illustrates the fields of a register in accordance with one embodiment of the invention; and FIG. 5 illustrates a system to implement the methods disclosed herein in accordance with one embodiment of the invention.

DETAILED DESCRIPTION

Figure 1:
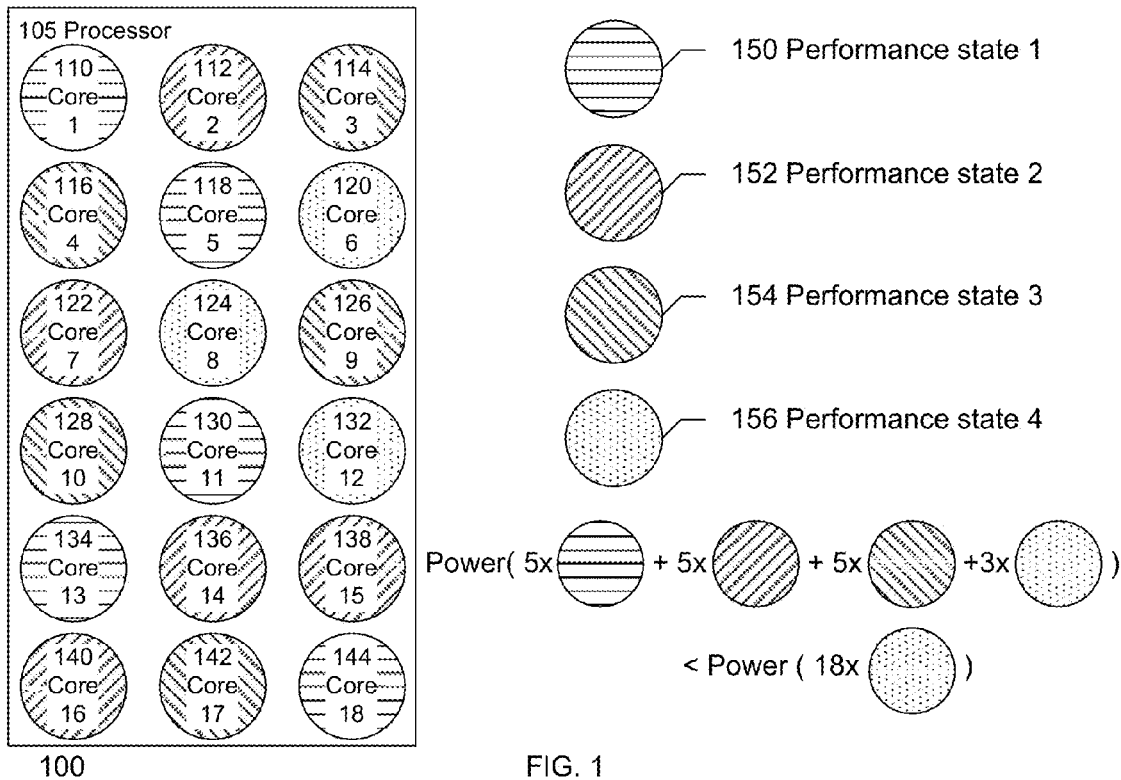
FIG. 1 illustrates the performance states of each core in a processor in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

For clarity of illustration, reference in the specification to a thread means a hardware thread or a logical processor or logical core. For clarity of illustration, the decreasing order of the number associated with a particular performance state (P-state) indicates the increasing order of the performance state. In this specification, for clarity of illustration, higher performance state implies a core operating at higher voltage/frequency and thus able to provide higher performance. In the ACPI literature, this would translate to P-states with lower numbers. Traditionally the highest performance state is denoted as P0, and P1 is a lower performance state. The history is that P1 corresponds to 1 frequency bin below P0, P2, is two frequency bins below P0 etc. Only when we refer to the ACPI P-state notation will we have these counter intuitive representations.

Embodiments of the invention provide a method and apparatus for per core performance states in a processor. For clarity of illustration, Per Core Performance States (PCPS) refer to the parallel operation of individual cores at different voltage and frequency points, i.e., the operating point of each core can be configured independently (within overall system power and thermal constraints) of the other cores. In one embodiment of the invention, PCPS is feasible due to the enabling technology of fully integrated voltage regulators (FIVR) that is integrated in the processor. FIVR allows independent configuration of each core and configuration includes, but is not limited to, voltage setting, frequency setting, clock setting and other parameters that affect the power consumption of each core.

In one embodiment of the invention, the processor has a plurality of processing cores and a power control module that is coupled with each of the plurality of processing cores. The power control module facilitates each processing core to operate at a performance state that is independent on the performance state of other processing cores, where the overall thermal and electrical constraints of the package or system are not violated.

FIG. 1 100 illustrates the performance states of each core in a processor 105 in accordance with one embodiment of the invention. FIG. 1 100 illustrates four states 1 150, 2 152, 3 154 and 4 156 of the cores. The performance state illustrates the configuration of each core that includes, but is not limited to, the voltage, the frequency, and other parameters that affect the performance or power consumption of the core. The performance states 1 150, 2 152, 3 154 and 4

156 of the cores illustrate four different configurations of the cores in one embodiment of the invention.

In one embodiment of the invention, the processor 105 is able to operate its cores, for example, eighteen cores as illustrated in FIG. 1, at different performance states. For example, the processor 105 is illustrated to execute the core 1 110, 5 118, 11 130, 13 134, and 18 144 at the performance state 1 150, execute the core 2 112, 7 122, 14 136, 15 138, and 16 140 at the performance state 2 152, execute the core 3 114, 4 116, 9 126, 10 128, and 17 142 at the performance state 3 154, and execute the core 6 120, 8 124, and 12 132.

By allowing its cores to have per core performance state configuration, the processor 105 is able to reduce its power consumption in one embodiment of the invention. For example, the performance state 4 156 is assumed to have a higher power consumption than the performance states 1 150, 2 152, and 3 154. By having 5 cores to execute at each of the performance states 1 150, 2 152, and 3 154 respectively and having 3 cores to execute at the performance state 4 156, the processor 105 saves power consumption when compared to executing all of its cores at the performance state 4 156.

FIG. 1 100 is not meant to be limiting and the processor 105 can have any number of cores in another embodiment of the invention. The processor 105 can configure its cores with more than or less than four performance states in another embodiment of the invention. The number of such performance states depends both on the number of cores and the maximum processor power rating in one embodiment of the invention.

Figure 2:
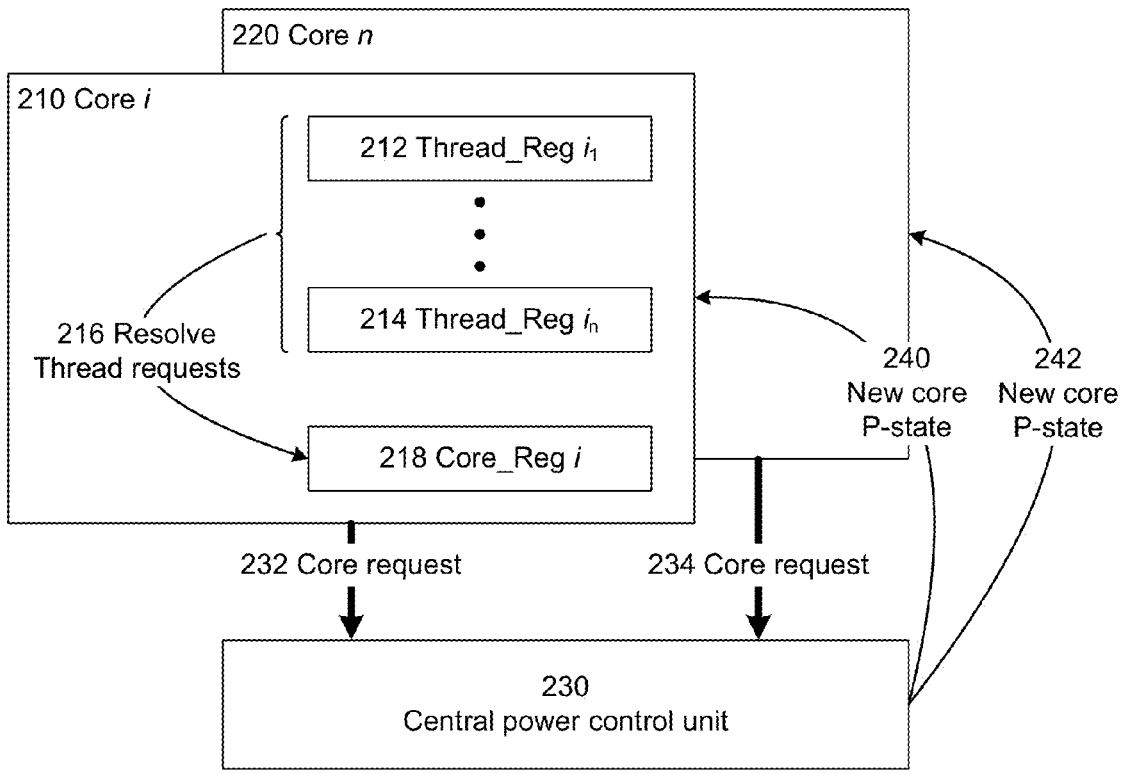
FIG. 2 illustrates a central power control unit in accordance with one embodiment of the invention.

FIG. 2 200 illustrates a central power control unit 230 in accordance with one embodiment of the invention. For clarity of invention, FIG. 2 200 is discussed with reference to FIG. 1 100. The central power control unit 230 is coupled with the core i 210 and the core n 220 in a processor. The core n 220 illustrates that the central power control unit 230 can be coupled with any number of cores in one embodiment of the invention.

In one embodiment of the invention, the core i 210 is executing a plurality of threads. Each thread sends a performance state request to the core i 210 and the core i 210 has logic to resolve all the performance state requests from the plurality of threads. In one embodiment of the invention, each thread request is stored in a register. For example, the register thread_reg $i_1$ 212 stores the thread request for the thread $i_1$. The core i 210 can support any number of threads as illustrated by the register thread_reg $i_n$ 214 that stores the thread request for the thread $i_n$. The hardware consolidation of the requests from all the threads (also known as hardware threads or logical cores) associated with the physical core in one embodiment of the invention.

The core i 210 receives all the performance state requests from all the threads and determines a resolved performance state request in one embodiment of the invention. The resolved performance state request is stored in the register core_reg i 218 in one embodiment of the invention. By consolidating the thread requests in each core, it helps the scalability and reduces the firmware or software cycles required for processing the performance state request in one embodiment of the invention.

The core i 210 sends a core request 232 to the central power control unit 230 to indicate that it has a new resolved performance state request in one embodiment of the invention. The workings of the core i 210 are similar to the workings for core n 220 and shall not be described herein. The core n 220 similarly sends a core request 234 to the central power control unit 230 to indicate that it has a resolved performance state request in one embodiment of the invention.

The central power control unit 230 receives core performance state requests 232 and 234 respectively from core i 210 and core n 220. For example, in one embodiment of the invention one or more bits of the core_reg i 218 are used to store the resolved performance state request and the central power control unit 230 reads the relevant bits of the core_reg i 218 to determine the resolved performance state request for the core i 210.

After determining the resolved performance state request for the core i 210 and core n 220, the central power control unit 230 sends the new core performance state (P-state) 240 and 242 to the core i 210 and core n 220 respectively. The central power control unit 230 is responsible for ensuring that core performance state requests are legitimate, meeting minimum and maximum performance state limits, and determining whether a request can be granted, that is, power, electrical, thermal, and other constraints are not violated. Based on these considerations, the core request may be adjusted, and the new request communicated to the cores. The core i 210 and core n 220 receive the new core performance state 240 and 242 respectively and changes or configures its operating parameter(s) based on the assigned new core performance state. The operating parameter(s) includes, but is not limited to, frequency and voltage, and in turn the performance state of the core.

The illustration in FIG. 2 is not meant to be limiting. In another embodiment of the invention, the cores may use other means to indicate to the central power control unit 230 that it has a resolved performance state request. For example, in another embodiment of the invention, each core may use a communication protocol to send the resolved performance state request to the central power control unit 230 in one embodiment of the invention. One of ordinary skill in the relevant art will readily appreciate how to use other means of indicating the resolved performance state request and shall not be described herein.

Figure 3:
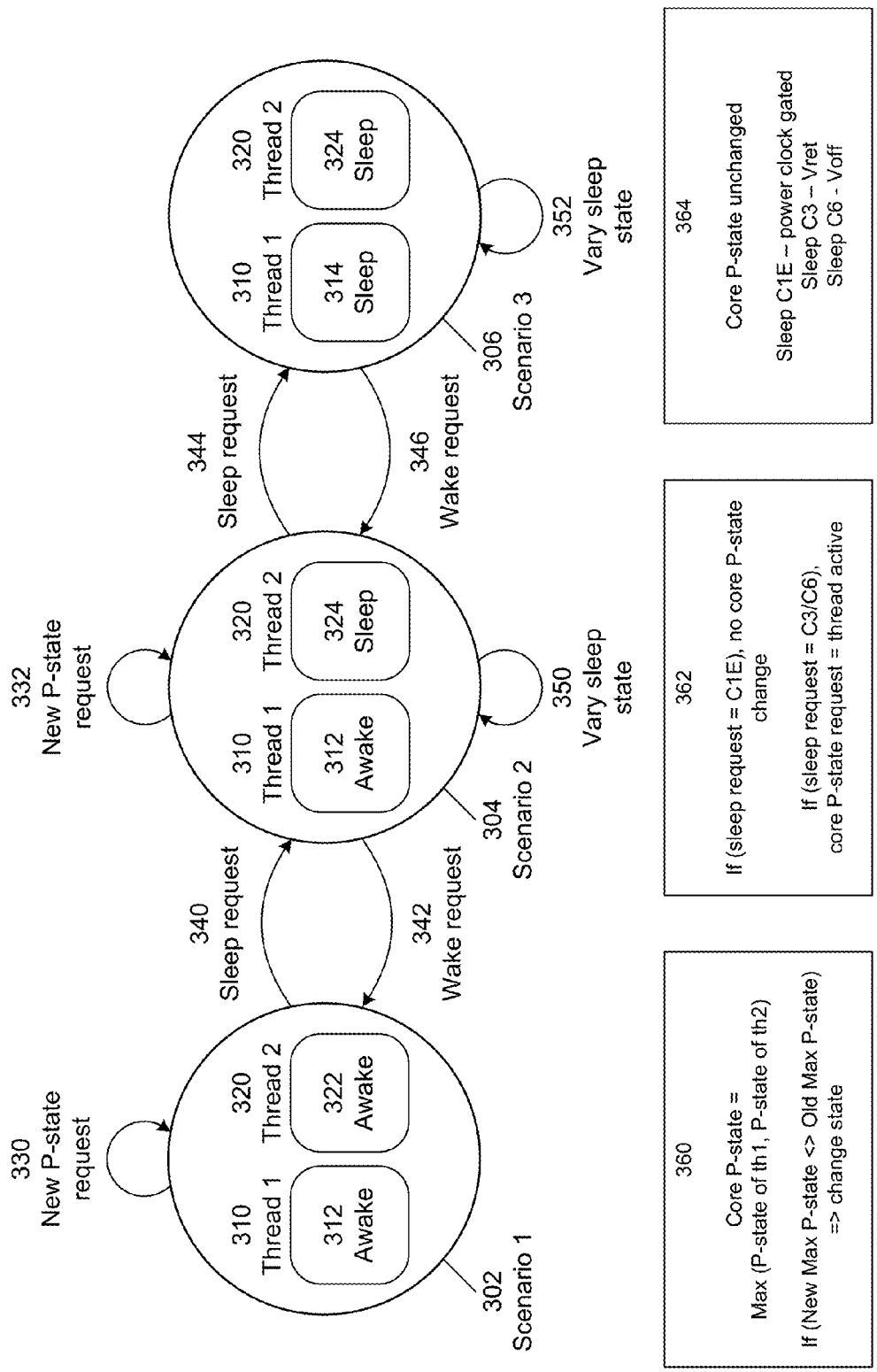
FIG. 3 illustrates the state transitions of a processor in accordance with one embodiment of the invention.

FIG. 3 300 illustrates the state transitions of a processor in accordance with one embodiment of the invention. For clarity and ease of illustration, the processor is assumed to have one processing core and the processing core is executing the hardware threads or logical cores 1 310 and 2 320. This is not meant to be limiting and the processor can have any number of cores and each core can execute any number of threads in another embodiment of the invention.

FIG. 3 illustrates three scenarios 302, 304, and 306 in one embodiment of the invention. In scenario 1 302, the threads 1 310 and 2 320 are assumed to be in the awake state 312 and 322 respectively. The awake or active state refers to a state where the thread is active in one embodiment of the invention. For example, in one embodiment of the invention, the processor supports performance states compliant with the advanced configuration and power interface specification (ACPI standard, "Advanced Configuration and Power Interface Specification", Revision 5.0, published 16 Dec. 2011). In one embodiment of the invention, the awake state includes the C0 processor performance state when the processor is compliant with the ACPI standard.

The table 360 illustrates an exemplary algorithm for resolving the performance state requests from the threads 1 310 and 2 320. The logic in the processor determines the current maximum performance state of the core in one embodiment of the invention. For example, in one embodiment of the invention, the logic in the processor determines the current maximum performance state of the core by determining the maximum performance state of the threads 1 310 and 2 320.

The logic in the processor determines the new maximum performance state of the core by determining the maximum of the performance state requests of the threads 1 310 and 2 320. If the new maximum performance state of the core is not equal to the current performance state of the core, the logic sends a new performance state request 330 to change the performance state of the core to the new maximum performance state in one embodiment of the invention.

When the processor receives a sleep request 340, scenario 2 304 illustrates the possible state changes of the core in one embodiment of the invention. The table 362 illustrates an exemplary algorithm for resolving the performance state requests from the threads 1 310 and 2 320. For clarity of illustration, thread 2 320 is assumed to send the sleep request 340 to the core in the scenario 2 304.

The logic in the processor checks the sleep request 340 and resolves the request based on the type of the sleep request in one embodiment of the invention. To avoid unproductive performance state transitions, the logic suppresses the sleep state request from each of the one or more threads when the duration of the sleep state request is less than the duration of switching the core to the sleep state.

For example, in one embodiment of the invention, when the sleep request 340 is a transient sleep state request to change to the C1E processor inactive state, the logic does not initiate a core P-state change. This is because the time to change the core to the C1E corresponding maximum efficiency performance state is longer than the duration of the C1E processor inactive state. In one embodiment of the invention, the thread voting rights of a thread that requested a transient sleep state are redefined such that it will not lose its vote. This allows the thread that requested the transient sleep state to avoid or prevent the core from switching to a low performance state and there is no exit latency penalty in one embodiment of the invention.

When the sleep request 340 is a sleep state request to change to the C3 or C6 sleep state for example, the logic in the processor keeps the thread 2 320 in the awake state 322. This is because the thread 1 310 is still in the awake state 312.

When the processor receives a sleep request 344, scenario 3 306 illustrates the possible state changes of the core in one embodiment of the invention. The table 364 illustrates an exemplary algorithm for resolving the performance state requests from the threads 1 310 and 2 320. For clarity of illustration, thread 1 310 is assumed to send the sleep request 344 to the core.

In the scenario 3 306, since both threads 1 310 and 2 320 are requesting the sleep state, the logic in the processor switches the core to the sleep state in one embodiment of the invention. The threads 1 310 and 2 320 switch to the sleep states 314 and 324 respectively. In each sleep state, different power reduction techniques are employed. For example, in one embodiment of the invention, when the thread 1 310 and 2 320 are in the C1E sleep state, the power of the core is reduced by clock gating the core. In another embodiment of the invention, when the threads 1 310 and 2 320 are in the C3 state, the power of the core is reduced by lowering the main voltage to the retaining voltage. In another embodiment of the invention, when the threads 1 310 and 2 320 are in a deep sleep state such as C6 state, the core saves its architectural state and the power of the core is switched off. In another embodiment of the invention, when both threads 1 310 and 2 320 are requesting a different sleep state, the logic in the processor switches the core to the lower sleep state that has a higher performance in one embodiment of the invention.

In one embodiment of the invention, the logic of the processor preserves the performance state of the threads 1 310 and 2 320 before they go to the sleep states 314 and 324. This allows the core to return to their pre-sleep performance state when they come out or wake up from their sleep state. This prevents back to back transitions from sleep to minimum P-state and from minimum P-state to the Operating System requested P-state in one embodiment of the invention.

In one embodiment of the invention, when both the threads 1 310 and 2 320 are in the sleep states 314 and 324, the logic generates a signal that indicates that the core is in an idle mode. The signal allows hardware detection that all the threads in a processor are in some sleep state and aggressive package level power savings can be immediately instituted in one embodiment of the invention.

The wake request 346 illustrates the transition from the scenario 3 306 back to the scenario 2 304 and the wake request 342 illustrates the transition from the scenario 2 304 back to the scenario 1 302. One of ordinary skill in the relevant art will readily appreciate how the reverse transitions are performed and shall not be described herein.

FIG. 4 400 illustrates the fields of a register in accordance with one embodiment of the invention. For clarity of illustration, FIG. 4 is discussed with reference to FIGS. 2 and 3. The register illustrates one embodiment of the core_reg i 218. In one embodiment of the invention, the register has 32 bits and has fields including, but not limited to, the performance state request (P_state_req), the minimum performance state (Min_p_state), the energy efficiency policy (energy_efficiency_policy), the vote request (vote_request), and the turbo mode disable bit (core_turbo_disable).

The performance state request field (bit range 6:0) is used for storing the resolved P-state request for a particular core in one embodiment of the invention. The resolved P-state request is the maximum of the P-state requested across threads associated with the particular core that have voting rights in one embodiment of the invention.

The minimum performance state field (bit range 14:8) is used for storing the Operating System (OS) minimum P-state request for the core associated threads in one embodiment of the invention. The OS minimum P-state request is the maximum of the minimum OS P-state requested for the threads associated with the particular core that also have voting rights in one embodiment of the invention.

For illustration, in a core with two threads 1 310 and 2 320, assuming that the OS wants (as in nice to have) thread 1 310 to execute at P-state P1 but it only needs (aka minimum pstate for quality-of-service) thread 1 310 to execute at P-state P2 and assuming that the OS wants thread 2 320 to execute at P-state P0 but it only needs thread 2 320 to execute at P-state P3, the logic in the core resolves the P-state requirements of the two threads 1 310 and 2 320. In this illustration, the logic compares the P-state request wanted by the OS for threads 1 310 and 2 320 and determines that the maximum P-state wanted by the OS is P-state P0 (Using ACPI terminology, P-state P0 has a higher performance state than P-state P1). Similarly, the logic compares the P-state request needed by the OS for threads 1 310 and 2 320 and determines that the maximum P-state needed by the OS is P-state P2 (P-state P2 has a higher performance state than P-state P3). The logic stores the P-state P0 in the performance state request field and stores the P-state P2 in the minimum performance state field in one embodiment of the invention.

The energy efficiency policy field (bit range 19:16) is used for storing the Energy Efficiency Policy for the particular core in one embodiment of the invention. The Energy Efficiency Policy is the minimum value (maximum performance) across threads associated with the particular core that has voting rights. A value of 0 means performance bias and it supports maximum performance requested across threads associated with the particular core that has voting rights in one embodiment of the invention.

The vote request field (bit range 30) is used for storing the vote request in one embodiment of the invention. The vote request is the logical OR of vote_request from the threads associated with the particular core. The vote request is set as logic one for threads that are active in one embodiment of the invention.

The turbo mode disable bit field (bit range 31) is used for setting the turbo mode in one embodiment of the invention. The turbo mode for the core is disabled if it is disabled globally or by any thread associated with the core. For example, if there are two threads for a core, the turbo mode disable is obtained from the logical OR of thread_0_turbo_disable, thread_1_turbo_disable, and global_turbo_disable in one embodiment of the invention.

The description of the register in FIG. 4 is not meant to be limiting. The fields of the register can be arranged in any suitable size and position without affecting the workings of the invention.

Operating systems such as Linux™, Windows™ and Mac OS have a tendency to often request one of the three following performance states: the maximum guaranteed frequency (P1), the frequency with the maximum efficiency (Pn), and turbo mode (P0). The intermediate frequencies between the maximum guaranteed frequency and the maximum efficiency frequency are not as often requested. To support this common use case, four masks are defined: Turbo_core_mask, Max_efficiency_core_mask, Max_guaranteed_core_mask and Other_core_mask.

For cores that have requested a maximum guaranteed frequency, a simple multi-cast communication is used in one embodiment of the invention. Multi-cast communication is also used for cores requesting the maximum efficiency frequency.

For cores that request a distinct P-state such as turbo mode or any other P-state, an uni-cast communication is used in one embodiment of the invention. The masks help scalability and speed up communication of new core working points.

FIG. 5 illustrates a system or platform 500 to implement the methods disclosed herein in accordance with one embodiment of the invention. The system 500 includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the system 500 used to implement the methods disclosed herein may be a system on a chip (SOC) system.

The processor 510 has a processing core 512 to execute instructions of the system 500. The processing core 512 includes, but is not limited to, fetch logic to fetch instructions, decode logic to decode the instructions, execution logic to execute instructions and the like. The processor 510 has a cache memory 516 to cache instructions and/or data of the system 500. In another embodiment of the invention, the cache memory 516 includes, but is not limited to, level one, level two and level three, cache memory or any other configuration of the cache memory within the processor 510. In one embodiment of the invention, the processor 510 has a central power control unit PCU 513.

The memory control hub (MCH) 514 performs functions that enable the processor 510 to access and communicate with a memory 530 that includes a volatile memory 532 and/or a non-volatile memory 534. The volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 534 includes, but is not limited to, NAND flash memory, phase change memory (PCM), read only memory (ROM), electrically erasable programmable read only memory (EEPROM), or any other type of non-volatile memory device.

The memory 530 stores information and instructions to be executed by the processor 510. The memory 530 may also store temporary variables or other intermediate information while the processor 510 is executing instructions. The chipset 520 connects with the processor 510 via Point-to-Point (PtP) interfaces 517 and 522. The chipset 520 enables the processor 510 to connect to other modules in the system 500. In another embodiment of the invention, the chipset 520 is a platform controller hub (PCH). In one embodiment of the invention, the interfaces 517 and 522 operate in accordance with a NP communication protocol such as the Intel® QuickPath Interconnect (QPI) or the like. The chipset 520 connects to a GPU or a display device 540 that includes, but is not limited to, liquid crystal display (LCD), cathode ray tube (CRT) display, or any other form of visual display device. In another embodiment of the invention, the GPU 540 is not connected to the chipset 520 and is part of the processor 510 (not shown).

In addition, the chipset 520 connects to one or more buses 550 and 560 that interconnect the various modules 574, 580, 582, 584, and 586. Buses 550 and 560 may be interconnected together via a bus bridge 572 if there is a mismatch in bus speed or communication protocol. The chipset 520 couples with, but is not limited to, a non-volatile memory 580, a mass storage device(s) 582, a keyboard/mouse 584 and a network interface 586. The mass storage device 582 includes, but is not limited to, a solid state drive, a hard disk drive, an universal serial bus flash memory drive, or any other form of computer data storage medium. The network interface 586 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 5 are depicted as separate blocks within the system 500, the functions performed by some of these blocks may be integrated within a single semiconductor circuit or may be implemented using two or more separate integrated circuits. The system 500 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A processor comprising:
    a plurality of cores, wherein each core comprises logic to:
        receive a performance state request from each of one or more threads;
        resolve the performance state request from each of the one or more threads to determine a resolved performance state request; and
        indicate the resolved performance state request to a power control module; and
    the power control module coupled to the plurality of cores, wherein the power control module is to facilitate each core to operate at a different performance state from the other cores based at least in part on the resolved performance state from each of the plurality of cores.

2. The processor of claim 1, wherein the power control module is to:
    facilitate each core to operate at a voltage level and a frequency setting that are different from the other cores.

3. The processor of claim 1, wherein the power control module is further to:
    determine the resolved performance state request from each core;
    send a multi-cast message to all cores having a common resolved performance state to switch to the common resolved performance state; and
    send an uni-cast message to each core having a different resolved performance state from the common resolved performance state to switch to the different resolved performance state.

4. The processor of claim 1, wherein each core comprises a register, and wherein the logic in each core is to set one or more bits of the register to indicate the resolved performance state request to the power control module.

5. The processor of claim 1, wherein the logic is to:
    determine a first maximum performance state of the one or more threads;
    determine a second maximum performance state from the performance state request from each of the one or more threads;
    determine whether the second maximum performance state is higher than the first maximum performance state; and
    determine the resolved performance state request based on the second maximum performance state in response to a determination that the second maximum performance state is different from the first maximum performance state.

6. The processor of claim 1, wherein the performance state request from each of one or more threads comprises a sleep state request, and wherein the logic is to:
    suppress the sleep state request from each of the one or more threads when a duration of the sleep state request is less than a duration of a core switch to the sleep state.

7. The processor of claim 1, wherein the performance state request from each of one or more threads comprises a transient sleep state request, and wherein the logic is to:
    retain a voting right for each thread having the transient sleep state request.

8. The processor of claim 1, wherein the performance state request from each of one or more threads comprises a wake request, and wherein the logic is to:
    determine a prior performance state of each thread having the wake request, wherein the prior performance state is a performance state of each thread prior to entry into a sleep state; and
    determine the resolved performance state request based on the prior performance state of each thread having the wake request.

9. The processor of claim 1, wherein the power control module is further to:
    determine that all resolved performance state requests from each core are sleep state requests; and
    indicate that the processor is in a sleep state.

10. A system comprising:
    a memory;
    a processor coupled with the memory, the processor comprising:
        a plurality of cores, wherein each core comprises logic to:
            receive a performance state request from each of one or more threads;
            resolve the performance state request from each of the one or more threads to determine a resolved performance state request; and indicate the resolved performance state request to a power control module; and the power control module coupled to the plurality of cores, wherein the power control module is to facilitate each core to operate at an independent performance state based at least in part on the resolved performance state from each of the plurality of cores.

11. The system of claim 10, wherein the power control module is to:

facilitate each core to operate at an independent voltage level and an independent frequency setting such that thermal and electrical constraints of the system are not violated.

12. The system of claim 10, wherein the power control module is further to:

determine the resolved performance state request from each core;

send a multi-cast message to all cores having a common resolved performance state to switch to the common resolved performance state; and send an uni-cast message to each core having a different resolved performance state from the common resolved performance state to switch to the different resolved performance state.

13. The system of claim 10, wherein each core comprises a register, and wherein the logic in each core is to set one or more bits of the register to indicate the resolved performance state request to the power control module.

14. The system of claim 10, wherein the logic in each core is to:

determine a first maximum performance state of the one or more threads;

determine a second maximum performance state from the performance state request from each of the one or more threads;

determine whether the second maximum performance state is different than the first maximum performance state; and determine the resolved performance state request based on the second maximum performance state in response to a determination that the second maximum performance state is different from the first maximum performance state.

15. The system of claim 10, wherein the performance state request from each of one or more threads comprises a sleep state request, and wherein the logic is to:

suppress the sleep state request from each of the one or more threads when a duration of the sleep state request is less than a duration of a core switch to the sleep state.

16. The system of claim 10, wherein the performance state request from each of one or more threads comprises a transient sleep state request, and wherein the logic is to:

retain a voting right for each thread having the transient sleep state request.

17. The system of claim 10, wherein the performance state request from each of one or more threads comprises a wake request, and wherein the logic is to:

determine a prior performance state of each thread having the wake request, wherein the prior performance state is a performance state of each thread prior to entering a sleep state; and determine the resolved performance state request based on the prior performance state of each thread having the wake request.

18. The system of claim 10, wherein the power control module is further to:

determine that all resolved performance state requests from each core are sleep state requests; and indicate that the processor is in a sleep state.

19. A method comprising:

receiving, in a logic of a core of a multicore processor, a performance state request from each of one or more threads;

resolving, in the logic, the performance state request from each of the one or more threads to determine a resolved performance state request; and indicating, from the core, the resolved performance state request to a performance control module of the multicore processor.

20. The method of claim 19, wherein indicating the resolved performance state request to the performance control module comprises setting one or more bits of a register to indicate the resolved performance state request to the performance control module.

21. The method of claim 19, wherein resolving the performance state request from each of the one or more threads to determine the resolved performance state request comprises:

determining a first maximum performance state of the one or more threads;

determining a second maximum performance state from the performance state request from each of the one or more threads;

determining whether the second maximum performance state is higher than the first maximum performance state; and determining the resolved performance state request based on the second maximum performance state in response to a determination that the second maximum performance state is different from the first maximum performance state.

22. The method of claim 19, wherein the performance state request from each of one or more threads comprises a sleep state request, and wherein resolving the performance state request from each of the one or more threads to determine the resolved performance state request comprises:

suppressing the sleep state request from each of the one or more threads when a duration of the sleep state request is less than a duration of switching the core to the sleep state.

23. The method of claim 19, wherein the performance state request from each of one or more threads comprises a transient sleep state request, and wherein resolving the performance state request from each of the one or more threads to determine the resolved performance state request comprises:

retaining a voting right for each thread having the transient sleep state request.

24. The method of claim 19, wherein the performance state request from each of one or more threads comprises a wake request, and wherein resolving the performance state request from each of the one or more threads to determine the resolved performance state request comprises:

determining a prior performance state of each thread having the wake request, wherein the prior performance state is a performance state of each thread prior to entering a sleep performance state; and determining the resolved performance state request based on the prior performance state of each thread having the wake request.

* * * * *